(12) United States Patent
Chakraborty et al.

(10) Patent No.: US 8,630,673 B2
(45) Date of Patent: Jan. 14, 2014

(54) METHOD AND SYSTEM FOR REDUCING FEEDBACK INFORMATION IN MULTICARRIER-BASED COMMUNICATION SYSTEMS BASED ON FREQUENCY GROUPING

(75) Inventors: Kaushik Chakraborty, San Diego, CA (US); Soumya Das, San Diego, CA (US); Ozgur Dural, San Diego, CA (US); Krishnan Rajamani, San Diego, CA (US); Samir S. Soliman, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 503 days.

(21) Appl. No.: 12/716,032

(22) Filed: Mar. 2, 2010

(65) Prior Publication Data
US 2010/0226452 A1 Sep. 9, 2010

Related U.S. Application Data

(60) Provisional application No. 61/157,144, filed on Mar. 3, 2009.

(51) Int. Cl.
*H04B 7/00* (2006.01)

(52) U.S. Cl.
USPC ........ 455/509; 455/513; 455/115.1; 455/464; 455/452.2; 375/260

(58) Field of Classification Search
USPC ........ 455/509, 67.11, 67.13, 455, 450, 452.1, 455/63.1, 513, 13.1, 132, 562.1, 101, 272, 455/115.1, 452.2, 464, 9, 512; 370/208, 370/329, 468, 252, 254, 310, 328, 312, 448, 370/522, 432.1, 320, 331; 375/260, 224, 375/341

See application file for complete search history.

(56) References Cited

U.S. PATENT DOCUMENTS

| | | | |
|---|---|---|---|
| 5,940,439 | A | 8/1999 | Kleider et al. |
| 6,108,374 | A | 8/2000 | Balachandran et al. |
| 6,131,016 | A | 10/2000 | Greenstein et al. |
| 6,154,489 | A | 11/2000 | Kleider et al. |
| 7,457,588 | B2 * | 11/2008 | Love et al. ................. 455/67.11 |
| 7,492,699 | B2 | 2/2009 | Cho |

(Continued)

FOREIGN PATENT DOCUMENTS

| EP | 1806893 A2 | 7/2007 |
|---|---|---|
| EP | 1816758 A2 | 8/2007 |

(Continued)

OTHER PUBLICATIONS

Caire G, et al., "Feedback schemes for multiuser MIMO-OFDM downlink" Information Theory and Applications Workshop, 2008, IEEE, Piscataway, NJ, USA, Jan. 27, 2008, pp. 33-40, XP031307631.

(Continued)

*Primary Examiner* — Tah Trinh

(57) ABSTRACT

Systems and methods for decreasing the amount of information sent on a feedback channel are disclosed. Various forms of spectral binning may be used to reduce the amount of information sent on the feedback channel. The systems and methods may be applicable to wideband communication systems, ultra-wideband communication systems, and/or other communication system using multiple carrier frequencies (e.g., tones).

54 Claims, 9 Drawing Sheets

(56) References Cited

U.S. PATENT DOCUMENTS

| | | | |
|---|---|---|---|
| 7,903,538 B2 | 3/2011 | Jacobsen et al. | |
| 7,953,170 B2 | 5/2011 | Currivan et al. | |
| 8,041,308 B2 | 10/2011 | Yun et al. | |
| 2002/0191703 A1 | 12/2002 | Ling et al. | |
| 2004/0106412 A1* | 6/2004 | Laroia et al. | 455/448 |
| 2004/0109424 A1* | 6/2004 | Chheda | 370/331 |
| 2004/0136399 A1 | 7/2004 | Roberts | |
| 2005/0157670 A1 | 7/2005 | Tang et al. | |
| 2005/0213690 A1 | 9/2005 | Lauer et al. | |
| 2005/0287978 A1 | 12/2005 | Maltsev et al. | |
| 2006/0072567 A1 | 4/2006 | Casaccia et al. | |
| 2006/0274712 A1 | 12/2006 | Malladi et al. | |
| 2007/0237167 A1 | 10/2007 | Kaneko et al. | |
| 2007/0243839 A1* | 10/2007 | Kostic | 455/132 |
| 2007/0264932 A1* | 11/2007 | Suh et al. | 455/13.1 |
| 2008/0009302 A1 | 1/2008 | Cho et al. | |
| 2008/0152028 A1 | 6/2008 | Futaki et al. | |
| 2008/0181160 A1* | 7/2008 | Dillon | 370/312 |
| 2009/0060064 A1 | 3/2009 | Futaki et al. | |
| 2010/0226269 A1* | 9/2010 | Chakraborty et al. | 370/252 |
| 2010/0227561 A1 | 9/2010 | Chakraborty et al. | |

FOREIGN PATENT DOCUMENTS

| | | |
|---|---|---|
| GB | 2386519 A | 9/2003 |
| JP | 2003169036 A | 6/2003 |
| JP | 2005502223 A | 1/2005 |
| JP | 2007043697 A | 2/2007 |
| JP | 2008539667 A | 11/2008 |
| WO | 0249305 A2 | 6/2002 |
| WO | WO 02078211 | 10/2002 |
| WO | 2006049123 A1 | 5/2006 |
| WO | 2006107037 A1 | 10/2006 |
| WO | 2006116102 A2 | 11/2006 |
| WO | WO 2007136212 A2 | 11/2007 |
| WO | WO 2008054099 A1 | 5/2008 |

OTHER PUBLICATIONS

Chen, et al: "The Capacity of Finite-State Markov Channels with Feedback", IEEE Transactions on Information Theory, IEEE, US, vol. 51, No. 3, Mar. 1, 2005, pp. 780-798, XP011127412, ISSN: 0018-9448, DOI:10.1109/TIT.2004.842697.

Ekpenyong A E, et al., "Feedback Constraints for Adaptive Transmission" IEEE Signal Processing Magazine, IEEE Service Center, Piscataway, NJ, US, vol. 24, No. 3, May 1, 2007, pp. 69-78, XP011184724.

Harish Viswanathan: "Capacity of Markov Channels with Receiver CSI and Delayed Feedback", IEEE Transactions on Information Theory, IEEE, US, vol. 45, No. 2, Mar. 1, 1999, XP011027310, ISSN: 0018-9448, pp. 761-771.

International Search Report—PCT/US2010/026090—International Search Authority, European Patent Office, Feb. 17, 2011.

International Search Report and Written Opinion—PCT/US2010/026105—ISA/EPO—Mar. 5, 2011.

International Search Report and Written Opinion—PCT/US2010/026114, International Search Authority—European Patent Office—Feb. 17, 2011.

Myeon-Gyun Cho et al: "A Joint Feedback 25,32, Reduction Scheme Using Delta Modulation 39,46 for Dynamic Channel Allocation in OFDMA Systems" IEEE International Symposium on Personal, Indoor and Mobile Radio Communications, vol. 4, Sep. 11, 2005, pp. 2747-2750, XP010928190.

Taiwan Search Report—TW099106204—TIPO—Jan. 23, 2013.

Written Opinion—PCT/US2010/026090—ISA/EPO—Feb. 17, 2011.

European Search Report—EP13020043—Search Authority—The Hague—Oct. 17, 2013.

* cited by examiner

| Rate (Mbps) | Bits | Rate (Mbps) | Bits |
|---|---|---|---|
| 53.3 | 000 | 200 | 100 |
| 80 | 001 | 320 | 101 |
| 106.7 | 010 | 400 | 110 |
| 160 | 011 | 480 | 111 |

| Compression Scheme | | Feedback load | Average rate |
|---|---|---|---|
| | | (bits) | (Mbps) |
| No compression | | 384 | 226.14 |
| Fixed binning | Size = 4 | 100 | 260.1 |
| | Size = 16 | 28 | 265.34 |
| Variable binning | No limit | 445.36 | 226.14 |
| | 4 ≤ Size ≤ 16 | 173.0 | 199.36 |

METHOD AND SYSTEM FOR REDUCING FEEDBACK INFORMATION IN MULTICARRIER-BASED COMMUNICATION SYSTEMS BASED ON FREQUENCY GROUPING

RELATED APPLICATIONS

The present Application for patent claims priority to U.S. Provisional Application No. 61/157,144 entitled "METHOD AND SYSTEM FOR REDUCING FEEDBACK INFORMATION IN COMMUNICATION SYSTEMS", filed Mar. 3, 2009, which is hereby expressly incorporated by reference in its entirety. This application is related to, and incorporates by reference in its entirety, Ser. No. 12/716,064, entitled "METHOD AND SYSTEM FOR REDUCING FEEDBACK INFORMATION IN MULTICARRIER-BASED COMMUNICATION SYSTEMS BASED ON TEMPORAL CORRELATION", filed simultaneously with this application. This application is also related to, and incorporates by reference in its entirety, Ser. No. 12/716,104, entitled "METHOD AND SYSTEM FOR REDUCING FEEDBACK INFORMATION IN MULTICARRIER-BASED COMMUNICATION SYSTEMS BASED ON TIERS", filed simultaneously with this application.

BACKGROUND

1. Field

The Application generally relates to communication networks and communication systems, including wideband and ultra-wideband communication systems. In particular, the Application relates to systems and methods for reducing the amount of data traffic on a feedback channel between a receiver and a transmitter.

2. Background

Wireless communication systems are widely deployed to provide various types of communication such as voice, packet data, and so on. These systems may be multiple-access systems capable of supporting communication with multiple users by sharing the available system resources. Examples of such multiple-access systems include code division multiple access (CDMA) systems, time division multiple access (TDMA) systems, and orthogonal frequency division multiplexing (OFDM) systems. Many forms of wireless communication systems use a feedback channel to improve the performance of the system. As data is sent between a transmitter and a receiver, the conditions of the communication channel being used may change. For example, as the receiver moves farther away from the transmitter, the communication channel conditions may degrade. The communication channel may also comprise a plurality of sub-carriers. Generally, the feedback channel is used by the receiver to transmit information about these changes in channel conditions to the transmitter. The information transmitted by the receiver on the feedback channel is often referred to as channel state information (CSI). In one embodiment, CSI may comprise an estimate or information about channel conditions for a certain channel. In another embodiment, CSI may comprise at least one of carrier-to-noise ratio (CNR), signal-to-noise ratio (SNR), received signal strength indicator (RSSI), signal-to-interference-and-noise-ratio (SINR), a signal strength, a noise level, and a data rate. It may also be referred to as channel quality indicator (CQI).

Generally, the CSI is sent from the receiver to the transmitter and may consume significant amounts of signaling resources. The CSI may provide, to the transmitter, data indicative of channel conditions obtained by the receiver. In one embodiment, the transmitter uses the CSI to control certain transmitter parameters including but not limited to, transmit signal power, data rate, or modulation and coding scheme. The CSI may be sent using CSI packets (e.g., packets sent from the receiver to the transmitter, which contain CSI). A plurality of CSI packets may be sent to the transmitter for a single feedback updates (e.g., an update that provides CSI for channel). In multicarrier-based wideband (WB) and ultra-wideband systems (UWB), e.g., OFDM-based systems, the feedback channel may be used to provide information for the plurality of subcarriers (e.g., tones). The feedback channel is responsible for providing CSI for the individual subcarriers on a timely basis, so that the transmitter may act on the available information. For example, if a transmitter receives CSI indicating that channel conditions have degraded, the transmitter may decide to transmit at a slower data rate. Thus, it is desirable to preserve signaling resources by reducing the amount of data traffic transmitted over feedback channels.

SUMMARY

In one embodiment, a method of communication in a wireless communication system is provided. The method comprises obtaining a first set of channel condition data representative of a collective channel condition of a first plurality of carrier frequencies. At least one first carrier frequency is grouped in the first plurality of carrier frequencies based, at least in part, on at least one of a channel condition of the at least one first carrier frequency and the collective channel condition. The method further comprises communicating the first set of channel condition data from a receiver to a transmitter.

In another embodiment, a device operable in a wireless communication system is provided. The device comprises a first module configured to obtain a first set of channel condition data representative of a collective channel condition of a first plurality of carrier frequencies. At least one first carrier frequency is grouped in the first plurality of carrier frequencies based, at least in part, on at least one of a channel condition of the first carrier frequency and the collective channel condition. The device further comprises a second module configured to communicate the first set of channel condition data from a receiver to a transmitter.

In yet another embodiment, a device operable in a wireless communication system is provided. The device comprises means for obtaining a first set of channel condition data representative of a collective channel condition of a first plurality of carrier frequencies. At least one first carrier frequency is grouped in the first plurality of carrier frequencies based, at least in part, on at least one of a channel condition of the first carrier frequency and the collective channel condition. The device further comprises means for communicating the first set of channel condition data from a receiver to a transmitter.

In a further embodiment, a computer program product, comprising a computer-readable medium is provided. The computer-readable medium comprises code for causing a computer to obtain a first set of channel condition data representative of a collective channel condition of a first plurality of carrier frequencies. At least one first carrier frequency is grouped in the first plurality of carrier frequencies based, at least in part, on at least one of a channel condition of the first carrier frequency and the collective channel condition. The computer-readable medium further comprises code for causing the computer to communicate the first set of channel condition data from a receiver to a transmitter.

DETAILED DESCRIPTION

Figure 1:
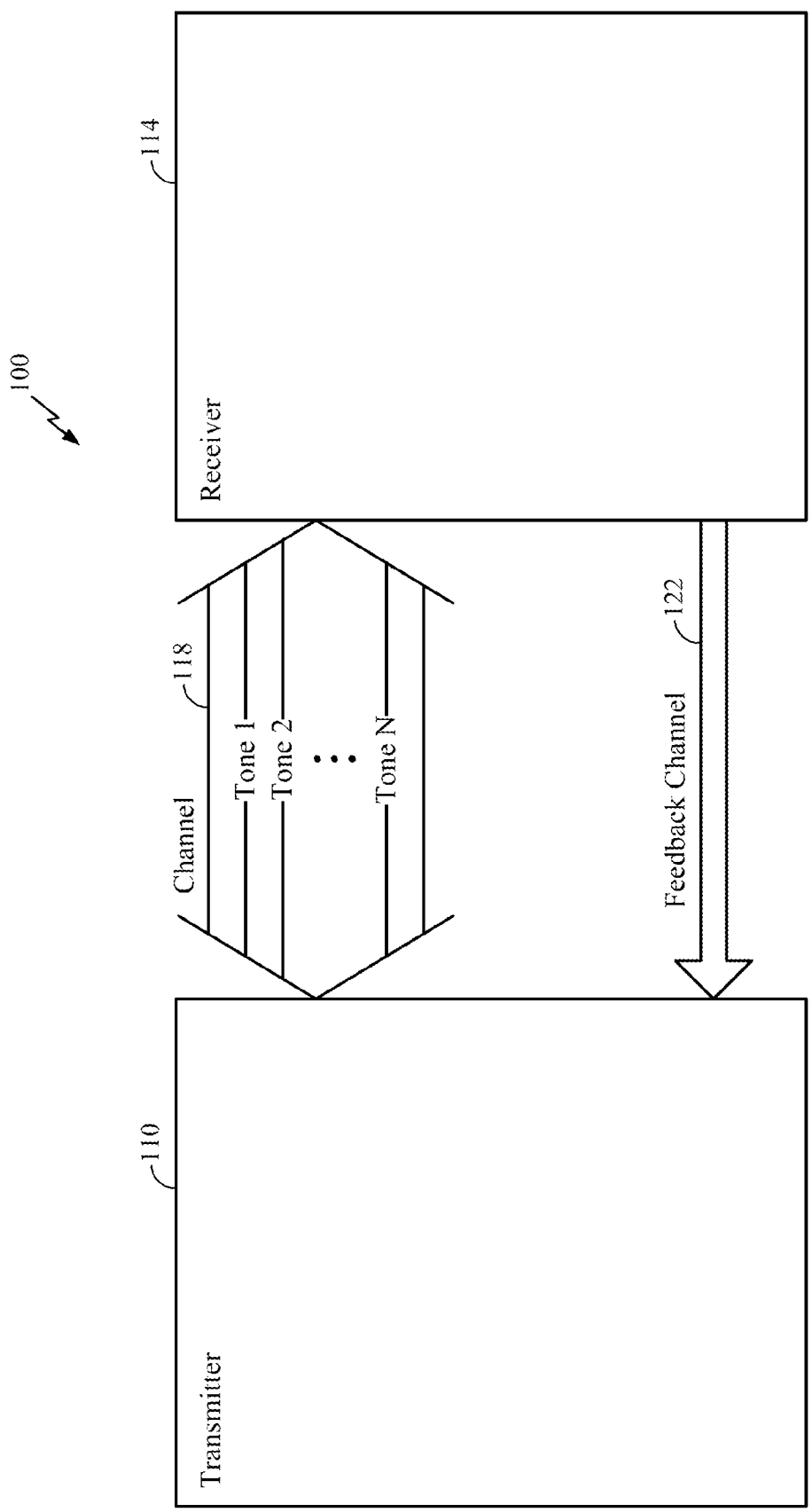
FIG. 1 is a block diagram illustrating a transmitter and a receiver in an exemplary wideband or ultrawideband wireless communication system.

In communication systems, channel conditions may be estimated via pilot tones at the receiver using techniques like least square (LS) estimation in both time domain and frequency domain. A pilot tone generally refers to a signal (e.g., a single frequency), which may be transmitted over a communications system for supervisory, control, equalization, continuity, synchronization, or reference purposes. Adaptive transmission schemes like power and rate control and other coding/modulation techniques may improve the communication performance of communication systems, provided that the transmitter has accurate estimates of the current channel conditions. As noted above, this channel state information (CSI) is typically conveyed from the receiver to the transmitter via a feedback channel which supports this control information with low latency, a reasonably high degree of accuracy, and low overhead.

For information about generating CQI measurement reports, reference is made to U.S. Pat. No. 7,457,588 (hereinafter '588) which is hereby incorporated by reference in its entirety.

Examples are provided to describe the operation of a feedback channel and the magnitude of information transmitted over the feedback channel. Although the following disclosure is describing applicability of the embodiments to UWB systems, one of ordinary skill in the art understands that certain embodiments are applicable to any communication system using a feedback channel. Some existing UWB system designs are based on the multi-band orthogonal frequency division multiplexing (MB-OFDM) system specified in the ECMA-368 standard. Certain embodiments of the invention may be described with reference to OFDM wireless communication systems. However, one of skill in the art will understand that the embodiments described herein may be applicable to any slowly time-varying wideband communication channel. Some embodiments may also be applicable to faster time-varying wideband communication channels.

As described below, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor, such as an application specific integrated circuit (ASIC). Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

FIG. 1 is a block diagram illustrating a transmitter 110 and a receiver 114 in an exemplary wideband or ultrawideband wireless communication system 100. The communication system 100 may be used to transmit and/or receive data between the transmitter 110 and the receiver 114 via a channel 118. The data may comprise voice, video, and multimedia data. The communication system 100 may comprise any type of communication system including, but not limited to, a code division multiple access (CDMA) system, a global system for mobile communication system (GSM), a wideband code division multiple access (WCDMA), and an OFDM system. The system 100 shown in FIG. 1 comprises an OFDM system. As shown in FIG. 1, the transmitter 110 is configured to transmit data to the receiver 114 via the channel 118. The receiver 114 is also configured to transmit data to the transmitter 110 via the channel 118. The channel 118 comprises multiple tones: Tone 1, Tone 2, up to Tone N. In one embodiment, system 100 effectively partitions the overall system bandwidth into any number of orthogonal tones, such as Tones 1 to N (e.g., as in an OFDM system). In one embodiment, each of Tones 1 to N may be associated with a respective subcarrier upon which data may be transmitted. In another embodiment, each of Tones 1 through N may be independent subcarriers. In yet another embodiment, each of the Tones 1 through 1 may not be independent subcarriers. Each of Tones 1 to N may be viewed as an independent transmission channel that may be used to transmit data between the transmitter 110 and the receiver 114. In one embodiment, the channel 118 may comprise N number of tones. The N number of tones may be any number. For example, N may be 100, such that the channel 118 comprises 100 tones. In another example, N may be 22 such that the channel 118 comprises 22 tones.

In the communication system 100, a substantially accurate estimate of the conditions of the wireless channel between the transmitter 110 and the receiver 114 is desirable in order to effectively transmit data on the available tones. For example, the channel conditions on Tone 1 may improve, while the channel conditions on Tone 2 may deteriorate. Thus, it may be desirable for the transmitter 110 to decrease the signal power for Tone 1, and increase the signal power for Tone 2. The receiver 114 may transmit CSI pertaining to the channel conditions of at least one of the tones, to the transmitter 110, using the feedback channel 122. For example, the receiver 114 may use the feedback channel 122 to transmit CSI to the transmitter 110 indicating an improvement in channel conditions for Tone 1 and a deterioration in channel conditions for Tone 2. The transmitter 110 may use the CSI received from the receiver 114, on the feedback channel 122, to reallocate or change the resources (e.g., transmit power, data rate, etc.) for the Tones 1 to N in the channel 118.

Figure 2:
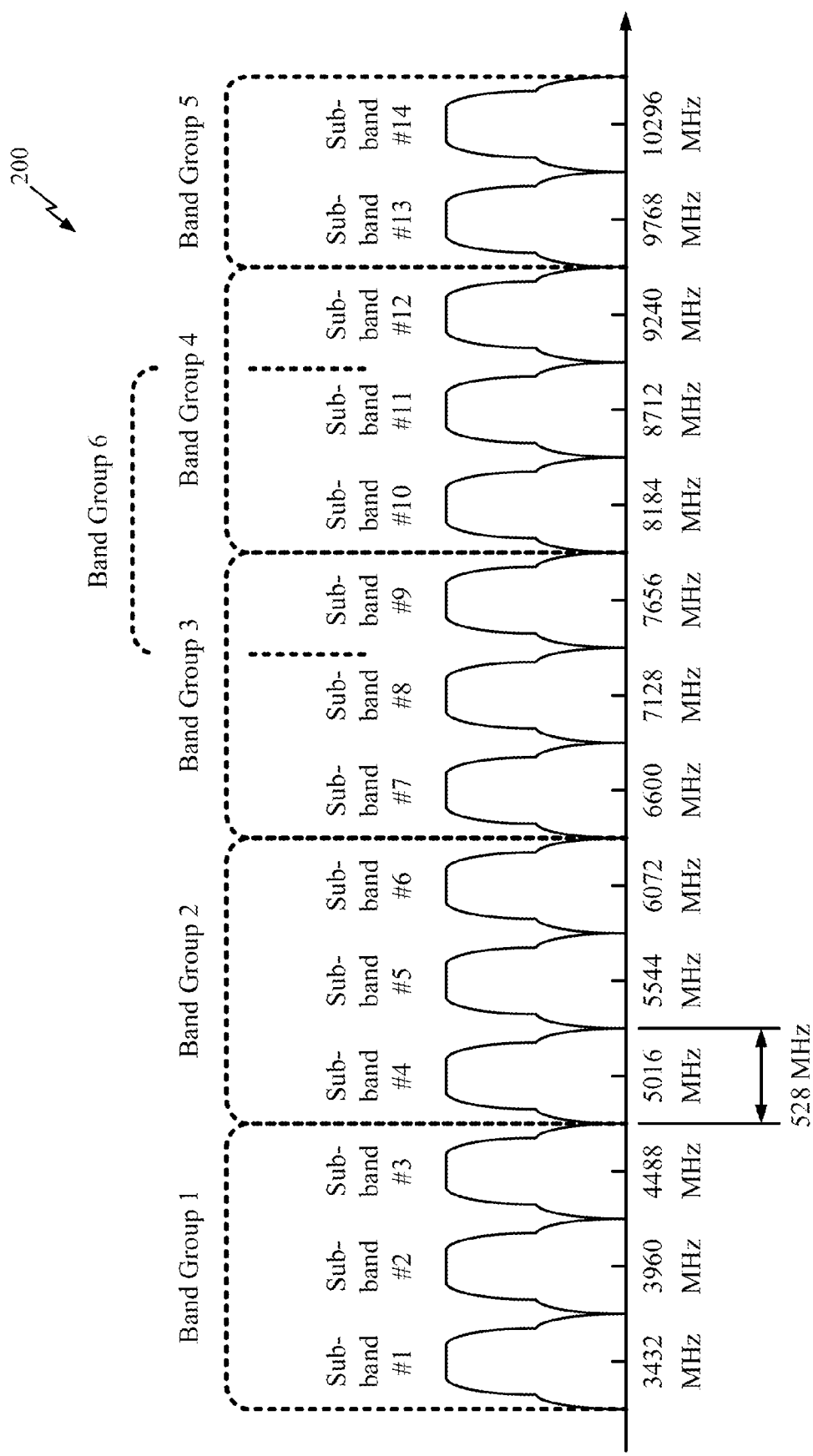
FIG. 2 is a diagram illustrating an exemplary spectrum allocation of the wireless communication system of FIG. 1.

FIG. 2 is a diagram illustrating an exemplary spectrum allocation 200 of the communication system 100 of FIG. 1. In one embodiment, the exemplary spectrum allocation 200 may be a spectrum allocation for a multi-band OFDM system (e.g., a system specified by the ECMA-386 standard). Spectrum allocation 200 is merely an exemplary allocation, and other spectrum allocations (e.g., frequencies and/or divisions of frequencies) may be used by other embodiments. The spectrum allocation 200 shows the different possible frequencies for the Tones 1 to N in the channel 118 of the communication system 100. The spectral range of spectrum allocation 200 ranges within 3.1 through 10.6 GHz. This spectral range of spectrum allocation 200 is subdivided into 14 contiguous sub-bands, Sub-bands 1 through 14. Each of the 14 sub-bands has a bandwidth 528 MHz. Each of the sub-bands contains 128 tones (e.g., at least some of Tones 1 through Tone N of FIG. 1), with a spacing of 4.125 MHz between each of the tones. The 14 sub-bands are grouped into 6 band groups, Band Groups 1 through 6. Band Groups 1 through 4 and 6 each have 3 sub-bands e.g., Band Group 1 has Sub-band 1, Sub-band 2, and Sub-band 3. Band Group 5 has 2 sub-bands: Sub-band 13 and Sub-band 14.

Referring to FIG. 1, the channel 118 may comprise any number of tones from any of the 14 sub-bands. For example, Tones 1 and 2 may be from Sub-band #1, but Tone N may be from Sub-band #3. In another example, Tone 1, Tone 2 up to Tone N may all be from Sub-band #8.

The coherence bandwidth (e.g., the range of tones which may experience similar channel conditions) of the communication system 100 may span several adjacent tones within or across the sub-bands shown in FIG. 2 (e.g., within Sub-Band #1 or across Sub-band #1 and Sub-band #2). Referring to FIG. 2, the coherence bandwidth of the communication system 100, according to one embodiment, is computed for different channel models CM1 through CM4. The channel models CM1 through CM4 are exemplary scenarios which the channel 118 may experience. The channel models CM1 through CM4 are described in J. R. Forester et al., *A Channel Model for Ultra Wideband Indoor Communicatin*, INTERNATIONAL SYMPOSIUM ON WIRELESS PERSONAL MULTIMEDIA COMMUNICATION (October 2003), which is hereby incorporated by reference in its entirety. For example, CM1 is a scenario where the distance between the transmitter 110 and the receiver 114 is less than 4 meters. In another example, CM3 is a scenario in which the distance between the transmitter 110 and the receiver 114 is four to ten meters. The coherence bandwidth may be 53.6, 28.9, 20.6 and 12.4 MHz in channel models CM1, CM2, CM3 and CM4, respectively. This may be calculated using a normalized cross-correlation of channel coefficients (e.g., real and/or complex numbers that indicate how the channel conditions affect the received signal at the receiver 114) across adjacent tones as a statistical parameter to determine coherence bandwidth. For example, a channel coefficient may represent the amplitude of a fade (e.g., degradation in signal strength) of a channel. The received signal amplitude may be obtained by multiplying a transmitted signal amplitude by the channel coefficient. The channel 118 may be represented in terms of multiple channel coefficients, where each channel coefficient is associated with one of the Tones 1 through N. Since each tone occupies a nominal bandwidth of 4.125 MHz, up to 13, 7, 5 and 3 adjacent tones are correlated in channel models CM1, CM2, CM3 and CM4, respectively. More discussion of the channel models CM1 through CM4 may be found in Q. Zou et al., *Performance Analysis of Multiband OFDM UWB Communications with Application to Range Improvement*, 56 IEEE TRANSACTIONS ON VEHICULAR TECHNOLOGY, 3864, 3864-3878, November 2007), whish is hereby incorporated by reference in its entirety.

This indicates that the channel 118 may be correlated in both temporal and spectral dimensions. There may also be other sources of correlation, including but not limited to:
  (i) correlation between forward and reverse links in a Time Division Duplexing (TDD) communication mode under quasi-static channel conditions.
  (ii) spatial correlation if multiple antennas are deployed
  (iii) multiuser correlation if multiple users cooperatively share local channel state information to construct a distributed global channel state matrix As shown in FIG. 2, tones in the communication system 100 may be categorized into Sub-bands 1 through 14. The Sub-bands 1 through 14 may each contain tones which are adjacent to each other. In one embodiment, all of the Tones 1 through N in the communication system 100 may belong to only one of the 14 Sub-bands. In another embodiment, the Tones 1 through N may be spread over multiple Sub-bands. For example, the Tones 1 through N may be spread over 3 Sub-bands. In another embodiment, the Tones 1 through N may be spread over any arbitrary set of Sub-bands. Several adjacent tones in the communication system 100 may experience nearly identical channel conditions. Since the dynamic transmission schemes adapt to the variations of the CSI that are provided to the transmitter 110, it may be desirable for the adaptive scheme to assign the same resources (e.g., signal power and/or data rates) to adjacent tones. This correlation across tones may be gainfully exploited to compress the CSI feedback. As discussed above, spectrum allocation 200 is merely an exemplary allocation and the embodiments described herein may be applicable to any spectrum allocation.

Figure 3:
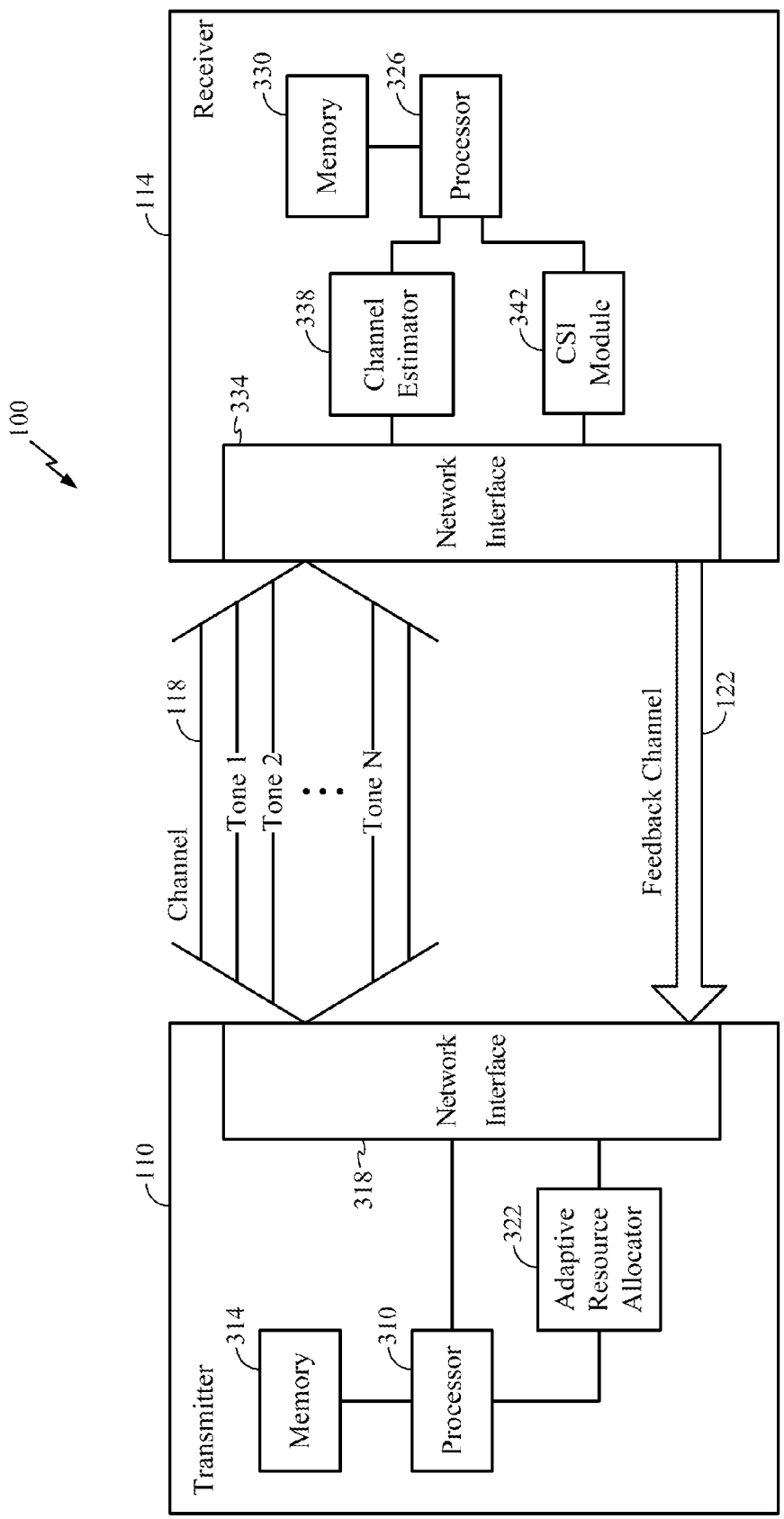
FIG. 3 is a block diagram illustrating exemplary components in the wireless communication system of FIG. 1.

FIG. 3 is a block diagram illustrating exemplary components of the transmitter 110 and the receiver 114 in the communication system 100 of FIG. 1. The transmitter 110 comprises a processor 310, a memory 314, a network interface 318 and an adaptive resource allocator 322. The memory 314 is coupled to the processor 310. The processor 310 is also coupled to the network interface 318 and the adaptive resource allocator 322. The adaptive resource allocator 322 is also coupled to the network interface 318.

The adaptive resource allocator 322 of the transmitter 110 is configured to adaptively allocate resources (e.g., increase/decrease signal power or data rates in response to CSI) for the channel 118. In one embodiment, the transmitter 110 may allocate resources each time new CSI is received. In another embodiment, the transmitter 110 may allocate resources only after a certain amount of CSI is received (e.g., after 3 CSI packets are received from the receiver 114 or after a predetermined period of time is passed). The adaptive resource allocator 322 may process the CSI itself, or it may use the processor 310 to process the CSI. The adaptive resource allocator 322 may then determine how to allocate resources to the tones in the channel 118, based on, at least in part, the CSI information received on the feedback channel 122 from the receiver 114. For example, the resource allocator 322 may adjust the signal power for each of Tones 1 to Tone N as shown in FIG. 1. If channel conditions change for any of the tones, the resource allocator 322 may adjust the signal power for the tones based on, at least in part, the channel conditions for the tones. For example, the adaptive resource allocator 322 may increase signal power for Tone 1 and decrease the signal power for Tone 2, based on, at least in part, the CSI received from the feedback channel 122.

The receiver 114 comprises a processor 326, a memory 330, a network interface 334, a channel estimator 338 and a CSI module 342. The memory 330 is coupled to a processor 326. The processor is also coupled to the channel estimator 338, the CSI module 342, and the network interface 334. The channel estimator 338 is coupled to the CSI module 342 and both the channel estimator 338 and the CSI module 342 are coupled to the network interface 334.

The channel estimator 338 of the receiver 114 is configured to determine and/or estimate channel characteristics (e.g., noise level, signal strength, SNR, RSSI, etc.) of at least one of the tones in the channel 118. The channel estimator 338 may use the processor 336 when determining and/or estimating the channel characteristics. The receiver 114 further comprises a channel state information (CSI) module 342 configured to calculate or determine CSI about the channel. This CSI is sent by the receiver 114 over the feedback channel 122 to the transmitter 110. The CSI generated by the CSI module 342 is based on, at least in part, the channel characteristics generated by the channel estimator 338. The CSI module 342 may use the processor 336 to generate the CSI or it may generate the CSI itself.

As shown in FIG. 3, the channel 118 may comprise multiple subcarriers or tones, such as Tones 1 to N. Data transmitted over the channel 118 may be transmitted using any combination of the tones. The channel conditions of the tones may vary over time. The time-varying channel conditions are estimated at the receiver 114 for signal detection via the channel estimator 338. The feedback channel 122 from the receiver 114 to the transmitter 110 periodically provides current estimates of CSI to enable adaptive resource allocation strategies at the transmitter 118. For simplicity while describing certain embodiments, it is desirable for the feedback channel 122 to be substantially noise-free. This means that the CSI is noiselessly communicated from the receiver 114 to the transmitter 110. But in other embodiments, the feedback channel 122 may experience noise. One of skill in the art understands that noise compensation techniques may be used in conjunction with the feedback channel 122.

The processors 310 and 326 may comprise any general purpose single or multi-chip microprocessor such as an ARM, Pentium®, Pentium II®, Pentium III®, Pentium IV®, Pentium® Pro, an 8051, a MIPS®, a Power PC®, an ALPHA®, an application specific integrated circuit (ASIC), or any special purpose microprocessor such as a digital signal processor, microcontroller, or a programmable gate array. The memories 314 and 330 may comprise a hard disk, RAM, ROM, a memory card, flash memory, a CD-ROM, a DVD-ROM, or any other means for storing data.

The network interfaces 318 and 334 may comprise at least one of a wired network card, a wireless network card, an antenna and some other means for communicating with a network. The network interfaces 318 and 334 may be connected to a local area network (LAN), or a wide area network (e.g., internet) or some other form of network. The network interfaces 318 and 334 may receive signals according to wired technologies including but not limited to Ethernet, telephone (e.g., POTS), and fiber optic systems, and/or wireless technologies including but not limited a code division multiple access (CDMA or CDMA2000) communication system, a time division multiple access (TDMA) system such as GSM/GPRS (General Packet Radio Service)/EDGE (enhanced data GSM environment), IEEE 802.11 systems, and OFDM systems. The network interfaces 318 and 334 may be used to transmit and/or receive a variety of types of data including, but not limited to, voice, video, and multimedia data.

Generally, there are different kinds of adaptive resource allocation to be considered. In one example, feedback may be provided to enable dynamic transmitter rate adaptation. In one embodiment, the receiver 114, based on the available CSI, may explicitly make decisions about resource allocation on behalf of the transmitter 110. In another embodiment, the transmitter 110 may allocate its resources based on, at least in part, the available feedback from the receiver 114. CSI may comprise raw quantization (e.g., converting the channel estimates of the receiver 114 to discrete values without performing any significant additional processing) of the receiver CSI, which is applicable to embodiments in which the receiver 114 aids the decision-making process at the transmitter 110 by providing the transmitter 110 with more information about the current channel conditions. In such an embodiment, the transmitter 110 may communicate its resource allocation decisions to the receiver 114 to ensure that the receiver 114 recovers reliably any information transmitted to it from transmitter 110. In the embodiments where the receiver 114 makes decisions about resource allocation on behalf of the transmitter 110, the receiver 114 is automatically informed of the adaptations, during the receiver decision-making process.

In one embodiment, to further benefit from adaptive transmission schemes, it may be desirable for the transmitter 110 to have accurate and current (e.g., not outdated) CSI on a per-bin basis. In general, the CSI may be a function of the channel conditions estimated at the receiver 114 by the channel estimator 338. Typically, the CSI at the receiver 114 comprises at least a real (or complex) number for each tone. The CSI provides an indicator of the current channel conditions on a per tone basis. If this information in its entirety is fed back to the transmitter 110, this may impose a high amount of traffic on the feedback channel 122. The transmitter 110 may not need the entire receiver CSI in order to perform the necessary adaptive control. Instead, the receiver 114 may quantize the CSI by identifying a partition of the space of receiver CSI into a set of contiguous and disjoint subsets. This partitioning may be done such that for all CSI elements in each of the subsets, the adaptive transmission scheme assigns the same resources. For example, such resources may include: (i) the number of bits in a bit loading algorithm, or (ii) the transmission power in an adaptive power control scheme, etc. The index of the relevant subset may then be fed back to the transmitter 110.

Even with this quantized feedback mechanism, the amount of CSI may be quite large. A quantized feedback mechanism may still result in a large amount of CSI if the adaptive transmission scheme dynamically adjusts its resources on a per-tone basis. In one embodiment, there may be a Link Feedback Information Element (IE) which comprises a single byte of CSI transmitted from the receiver 114 to the transmitter 110 over the feedback channel 122. In one embodiment, the CSI may not be on a per tone basis, but may instead be on a per bin basis, as discussed below in conjunction with FIGS. 5A through 5D. The Link Feedback IE may also comprises 2 bytes to indicate a device address for the device that the CSI is associated with, 1 byte for an element ID, and 1 byte to specify the length of the Link Feedback IE. The element ID may indicate the type of the IE. For example, the Link Feedback IE may have a numerical value of 16 for its element ID. In another embodiment, a single Link Feedback IE may be used to provide CS to multiple transmitters. One embodiment may use 4 bits to update data rate and 4 bits to update transmitter power level changes.

As discussed above, the transmitter 110 does not only periodically adapt the transmission data rate, but may also perform more sophisticated dynamic power allocation and other coding/modulation techniques on individual tones. More refined adaptive schemes may demand a finer granularity of CSI feedback, and may impose a higher load on the feedback channel 122. As described further below, dynamic adaptation may be done at the transmitter 110 based on quantized CSI feedback from the receiver 114 on the feedback channel 122.

In one embodiment, the receiver 114 may estimate various channel parameters, such as the signal-to-noise ratio (SNR) for each tone, and may use this SNR estimate as an indicator of the channel strength. An adaptive transmitter power control algorithm may dynamically adjust the transmitter power level according to the receiver SNR estimate to maximize the average transmission rate over all the data tones. The transmitter 110 may also perform other dynamic coding and modulation schemes based on the quantized SNR information. In this embodiment, partitioning the SNR space into K subsets will require a feedback load (e.g., the amount of information needed to convey CSI to the transmitter 110) of $N_b = \lceil \log_2 K \rceil$ bits per tone per feedback update. For example, with $N_b=6$, a granularity of $2^6=64$ different quantization levels of SNR may be accommodated. Assuming $N_t=100$ tones, the feedback load in this case is 100*6=600 bits per update, which may be larger than desired.

In one embodiment, systems and methods are provided for compressing feedback load (e.g., reducing the amount of CSI) without significantly altering the performance of the adaptive transmission schemes. As discussed above, channel characteristics of communications systems, including the communication system 100 may be highly correlated in several ways. A measure of the duration of time during which channel conditions are substantially unchanged may be referred to as a "coherence time interval", which may be of the order of several milliseconds. On the other hand, the duration of a data packet may typically be of the order of only a few microseconds. For example, with a transmitter-receiver relative mobility speed of v=3 m/s and a carrier frequency $f_c$=4 GHz, a practical estimate of the coherence time is given by $$T_c \approx \frac{0.423c}{vf_c} = \frac{0.423 \times 3 \times 10^8}{3 \times 4 \times 10^9} \approx 10 \text{ ms}.$$

One embodiment specifies variable-sized medium access control (MAC) packets whose transmission duration may range from 0.3125-112.5 μs. Therefore, several consecutive transmitted packets may experience nearly identical channel conditions between the transmitter 110 and the receiver 114.

Figure 4:
FIG. 4 is a table illustrating an exemplary assignment of feedback bits representing different bit rates for the wireless communication system of FIG. 3.

FIG. 4 is a table 400 illustrating an exemplary assignment of feedback bits representing different bit rates for the wireless communication system 100 of FIG. 3. As shown in the table 400, different data rates may be represented by different bit patterns. The table 400 shows the bit patterns used to represent the 8 different data rates. The "Rate (Mbps)" column indicates the speed of the data rate for the Tones 1 through N as shown in FIG. 3. The "Bits" column indicates the bit pattern used to represent the corresponding data rate. For example, Tone 1 in channel 118 may be operating at a data rate of "80 Mbps." The data rate of "80 Mbps" is represented by the bit pattern "001."

For the following description, let $N_t$ denote the number of tones, Tone 1 to N, being used by the channel 118 to communicate data between the transmitter 110 and the receiver 114 of the communication system 100, as shown in FIGS. 1 and 3. Let $N_b$ denote the number of bits of CSI required per update per tone. Then, the total number of feedback bits that needs to be sent via the feedback channel 122 is $N_t * N_b$ per update. Note that $N_b$ may depend on the dynamic resource allocation schemes adapted at the transmitter 110. For example, referring to FIG. 2 and FIG. 3, the table 200 shows that the 8 different data rates used by Tones 1 through N of the communication system 100, are each represented using 3 bits. In another embodiment the communication system 100 may use 16 different data rates, which would require 4 bits to represent all of the 16 data rates. Thus, in this embodiment, $N_b=4$.

Referring to FIG. 3, the communication system 100 has a rate adaptation scheme in which the transmitter 110 assigns to each of Tone 1 to N, one of the following 8 data rates: 53.3 Mbps, 80 Mbps, 106.7 Mbps, 160 Mbps, 200 Mbps, 320 Mbps, 400 Mbps and 480 Mbps. In this example, the receiver 114 adapts to data rates that are mapped (e.g., assigned) based on the receiver CSI. This mapping may be performed at the receiver 114 based on the receiver CSI, and is transparent to the transmitter 110 (e.g., the transmitter 110 does not know what the actual mapping is). The receiver 114 may convey only the mapped state value to the transmitter 110 via the feedback channel 122. The table 400 shows each of the 8 possible rates represented by $N_b = \log_2 8 = 3$ bits. Assuming $N_t = 100$ tones, the amount of feedback needed per update for all of the 100 tones would be 100*3=300 bits.

In one embodiment, a spectral binning algorithm may be used to judiciously combine (e.g., group or designate) several adjacent tones into a single spectral group (e.g., bin). According to this embodiment the feedback mechanism provides CSI updates on a per-bin basis instead of the per-tone basis as discussed earlier. This provides a feedback compression factor of $N_t/K_b$, where $N_t$ is the total number of tones and $K_b$ is the number of spectral bins. In one embodiment, the binning algorithm may combine a fixed number of tones in each bin, or the number of tones in different bins may be different. Furthermore, in another embodiment, the mapping from tones to bins may be determined beforehand and kept unchanged during the entire communication process. In yet another embodiment, the mapping may be dynamically changed during the course of communication. Higher variability in the binning algorithm may lead to finer granularity in the feedback process, and may incur a greater feedback load. The choice of the appropriate level of granularity may depend on the design constraints of the communication system 100.

Figure 5A:
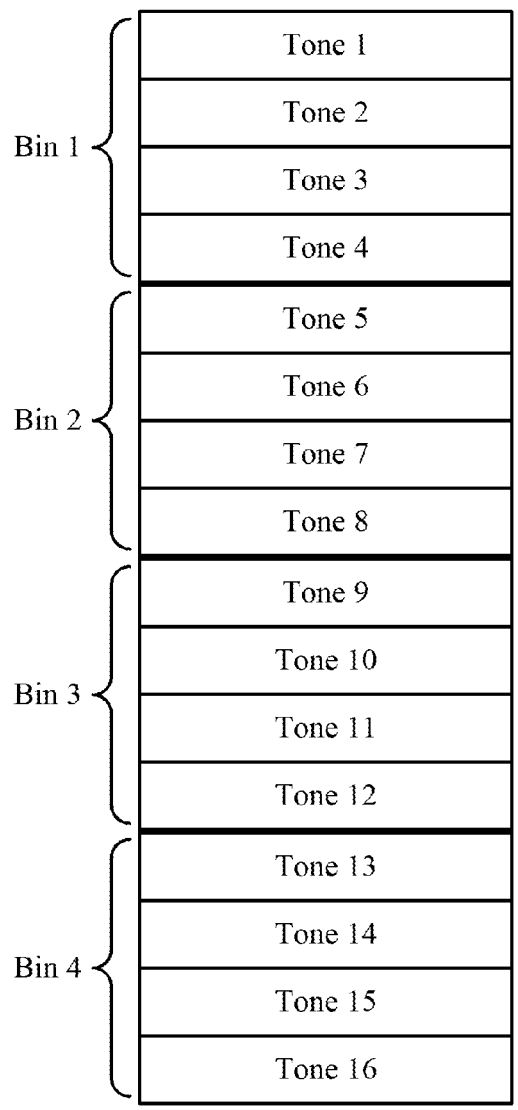
FIG. 5A is a diagram illustrating an exemplary binning of tones according to one embodiment.

FIG. 5A is a diagram illustrating an exemplary binning of tones according to one embodiment. FIG. 5A shows a total of 16 tones. Each of the 16 tones is designated to one of Bins 1 through 4. In this embodiment, a fixed-size binning algorithm is used wherein an equal number of tones (e.g., 4 tones) are designated to each of the Bins 1 through 4. For example, Tones 1, 2, 3, and 4 are designated to Bin 1. Let $K_t$ denote the number of tones per bin. The feedback load is then given by $K_b * N_b$ bits per update, where $K_b = N_t / K_t$ is the total number of bins and $N_b$ is the number of bits needed per update per tone. Therefore, a compression factor of $N_t / K_b = K_t$ may be achieved by the fixed size binning algorithm. As shown in FIG. 5A, there are a total of 16 tones. Using a fixed-size binning algorithm, there are four tones per bin, thus $K_t = 4$. As shown in FIG. 4, 3 bits are needed per update per tone, thus $N_b = 3$. The feedback load for the fixed-sized binning shown in FIG. 5A is 3*4=12 bits. Without fixed-size binning, 3 bits per tone would be needed to send CSI, which would result in 3*16=48 bits to send CSI. The embodiment shown in FIG. 5A provides a compression factor of 4, which means that CSI may be sent using only a ¼ of the bits needed if fix-sized binning is not used. Depending on the total number of tones, and the number of bins, this binning embodiment may provide a variety of different compression factors.

In one embodiment, the bin boundaries shown in FIG. 5A may change if the conditions in the communication system 100 change. For example, as shown in FIG. 5A, there are 4 bins, each bin having 4 tones. The conditions for the Tones 1 through 16 may change such that grouping the tones into 8 bins, each bin having 2 tones would be desirable. In this embodiment, this new fixed-size binning information may be communicated to the transmitter using various systems and techniques described below in conjunction with FIGS. 7 and 8.

The different tones may be allocated to the bins using a variety of factors. For example, the tones may be designated to the bins based on their current channel conditions. Referring to FIG. 5A, Tones 1 through 4 may have the best channel conditions, and thus are designated to Bin 1. Tones 5 through 8 may have the second best channel conditions and thus are designated to Bin 2. Tones 9 through 12 may have the third best channel conditions and thus are designated to Bin 3. Tones 13 through 16 may have the fourth best channel conditions and thus are designated to Bin 4. In another embodiment, the tones may be designated to the bins based on their identification, based on a pre-determined designation scheme, based on location, and based on other channel characteristics. A variety of factors may be used to designate each of the tones to a spectral bin.

Figure 5B:
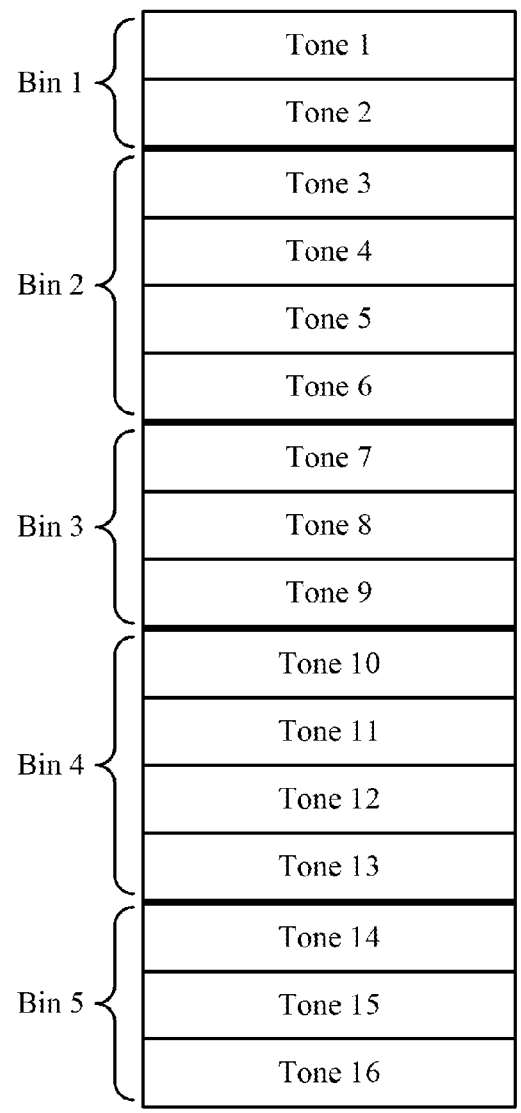
FIG. 5B is a diagram illustrating an exemplary binning of tones according to another embodiment.

FIG. 5B is a diagram illustrating an exemplary binning of tones according to another embodiment. Each of the 16 tones is designated to one of Bins 1 through 5. As shown in FIG. 5B, a different number of tones may be designated to each bin. Tones 1 and 2 are designated to Bin 1, Tones 3 through 6 are designated to Bin 2, Tones 7 through 9 are designated to Bin 3, Tones 10 through 13 are designated to Bin 4, and Tones 14 through 16 are designated to Bin 5. In the embodiment shown in FIG. 5B, there may be a variable-sized binning algorithm wherein a finer level of granularity may be achieved by allowing different bins to have a different number of tones. For example, let $K_b$ denote the total number of bins, and let $K_{t,i}$ denote the number of tones in the $i^{th}$ bin, $i=1, \ldots, K_b$. The total number of tones is $N_t = \sum_{i=1}^{K_b} K_{t,i}$, and the feedback load is $K_b * N_b$ bits per update. The compression factor using this variable size binning scheme is $N_t / K_b = \sum_{i=1}^{K_b} K_{t,i} / K_b$. As discussed above, the amount of bits needed for CSI updates, without using binning, is 48 bits. Using variable binning as shown in FIG. 5B, 3 bits of CSI will needed per bin, and there are 5 bins. Thus, the number of bits needed to transmit CSI for the embodiment shown in FIG. 5B is 3*5=15 bits. In one embodiment, if the number of tones in a bin changes, then more bits may be used to specify the new number of tones in the bin. As discussed above, the tones may be allocated to the different bins based on, at least in part, a variety of factors including channel characteristics.

In one embodiment, a static binning algorithm is used wherein the tones are not re-designated to different bins, even if their channel conditions change. The binning parameters, e.g., ($K_b$, $K_t$) in the fixed size binning algorithm and ($K_b$, $\{K_{t,i}, i=1, \ldots, K_b\}$) in the variable size binning algorithm, may be determined offline and kept unchanged for the entire communication period. In this static embodiment, the binning parameters need not be updated dynamically by the receiver 114 through the feedback channel 122. Although not shown in the figures, the static binning algorithm may be used alone, or in combination with the fixed and the variable binning embodiments discussed above. In a certain embodiment, the receiver 114 may designate a fixed number of tones per bin, and once the designation is set, the tones are not re-designated to different bins, even if their channel conditions change. In another embodiment, the receiver 114 may designate a variable number of tones per bin, and once the designation is set, the tones are not re-designated to different bins, even if their channel conditions change.

Figure 5C:
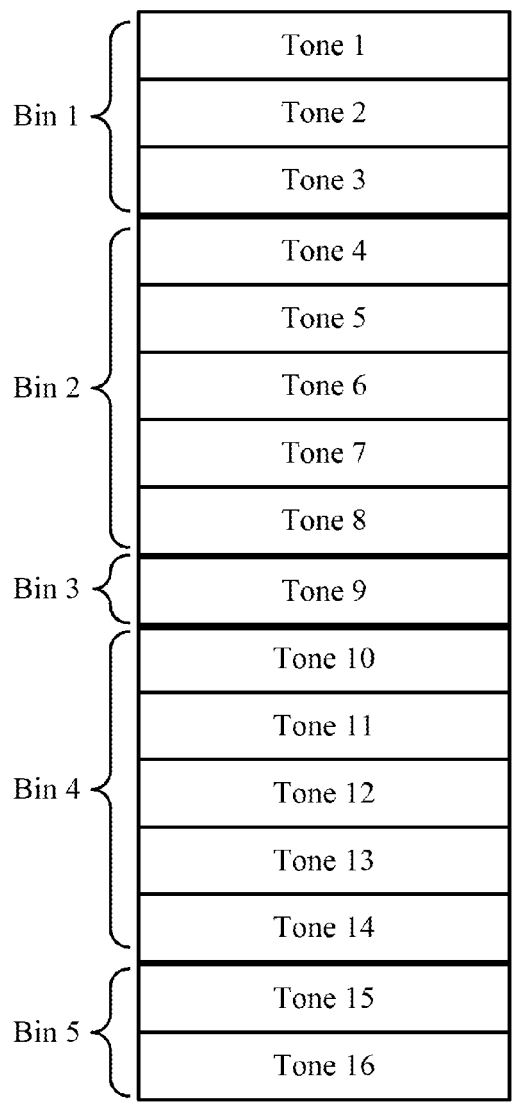
FIGS. 5C and 5D are diagrams illustrating an exemplary binning of tones according to yet another embodiment.
Figure 5D:
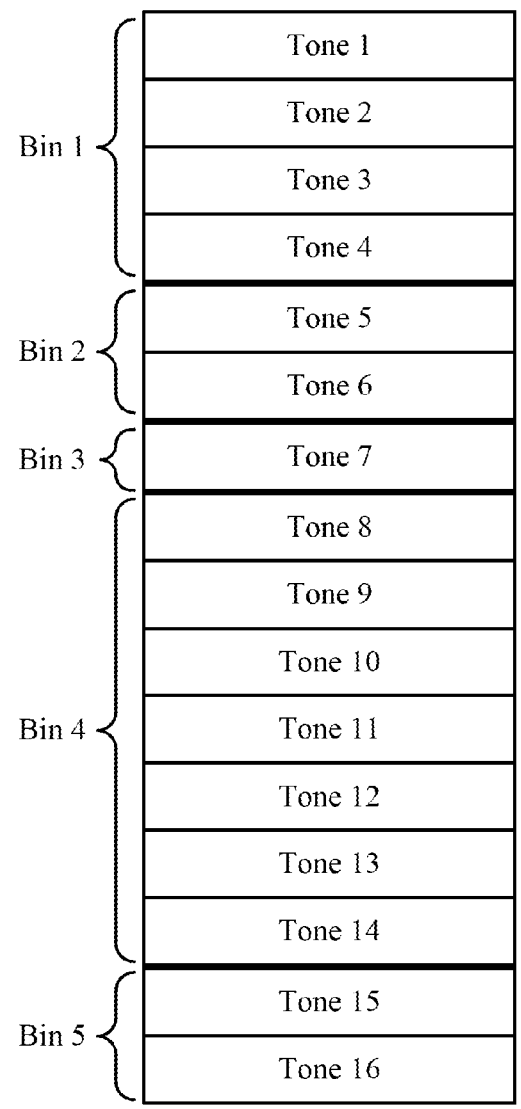

FIGS. 5C and 5D are diagrams illustrating an exemplary binning of tones according to yet another embodiment. FIG. 5C shows the initial designations of Tones 1 through 16 into one of Bins 1 through 5 after an initial determination of the channel characteristic of the tones. FIG. 5D shows the re-designation of Tones 1 through 16 into one of Bins 1 through 5 after channel characteristics of the Tones 1 through 16 are re-evaluated.

FIG. 5C shows an initial designation of Tones 1 through 16 into Bins 1 through 5. Based on the current channel characteristics of the tones, Tones 1 through 16 are designated to one of Bins 1 through 5. Tones 1 through 3 are designated to Bin 1, Tones 4 through 8 are designated to Bin 2, Tone 9 is designated to Bin 3, Tones 10 through 14 are designated to Bin 4, and Tones 15 and 16 are designated to Bin 5. After this initial designation, the channel conditions for Tones 1 through 16 may change. This may be the result of a variety of factors including, but not limited to, interference, movement of one or both of the transmitter 110 and the receiver 114, and noise. After a period of time, the receiver 114 may reevaluate the channel conditions for Tones 1 through 16. After reassessing the conditions for Tones 1 through 16, it may re-designate the tones into different bins.

FIG. 5D shows the re-designation of Tones 1 through 16 into different bins, after the receiver 114 has reevaluated the channel conditions for each of the tones. As shown in the figure, Tone 4 has been designated to Bin 1 from Bin 2, Tone 7 has been designated from Bin 2 to Bin 3, Tone 8 has been designated from Bin 2 to Bin 4, Tone 9 has been designated from Bin 3 to Bin 4, and the remaining tones remained in their previous bin designation. In FIG. 5D, the tones are re-designated to one of Bins 1 through 5 based on the channel conditions of the tones. In another embodiment not shown in the figures, new bins may be added, or existing bins may be deleted, in addition to the re-designation of tones. For example, Referring to FIG. 5C, Tone 9 may be re-designated from the Bin 3 to Bin 2. Bin 3 may then be deleted since it does not have any tones. In one embodiment, if a bin is deleted (e.g., Bin 3), the subsequent bins (e.g., Bins 4 and 5) may be renumbered (e.g., renumbered to Bins 3 and 4). One of skill in the art understands that any number of bins may be added and/or deleted, and that any of the tones may be designated to any of the bins.

In this embodiment, a dynamic binning algorithm may be used, wherein different tones may be designated to different bins, depending on the channel conditions. This embodiment may be particularly helpful if the spectral characteristics of the channel change during the course of transmission. In this embodiment the binning parameters may be dynamically updated through the feedback channel 122. The feedback load may be greater in dynamic binning schemes in certain situations when compared to static, variable and fixed binning schemes. This embodiment is still applicable where the spectral characteristic of the channel do not change, or change to a lesser degree during the course of transmission.

In one embodiment, a binning algorithm that is a combination of the above-referenced binning algorithms may be used. The combination of fixed and static binning algorithms may be the most simplistic and involves minimal feedback load. The combination of variable sized and dynamic binning algorithms may offer the most adaptability at the cost of increased feedback load. One of skill in the art will recognize that a judicious implementation takes into account the variability of channel conditions as well as system design constraints.

Irrespective of the type of binning algorithm used, in some embodiments, the binning parameters may be chosen from the spectral characteristics of the channel 118. In one embodiment using the fixed size binning scheme, the number of tones per bin $K_t$ may be chosen arbitrarily. In another embodiment, the number of tones may be chosen by minimizing a statistical metric that measures the difference in performance between the compressed feedback scheme and the full feedback scheme. One such metric is the collection of normalized cross-correlation coefficients of the spectral tones, which may be used to determine the coherence bandwidth of the communication system 100. The cross-correlation channel coefficients may comprise a measure of this correlation across different channel coefficients. In one embodiment, the cross-correlation channel coefficients may comprise a matrix. The matrix may have high values close to the diagonal and values close to zero away from the diagonal. These close values may indicate that tones farther apart experience independent fading. In an embodiment using the variable size binning scheme, the relevant binning parameters may be chosen on the basis of the normalized cross-correlation coefficients of the tones.

In one embodiment, let $\rho_{i,j}$ denote the cross-correlation between tone i and tone j. Then $\rho_{i,i}=1$, $i=1, \ldots, N_t$. The correlation strength may decrease as the difference $|i-j|$ increases. Therefore, in one embodiment, a variable size binning algorithm may be designed based on a correlation threshold level $\rho \in (0,1)$ as follows. The number of tones in the first bin $K_{t,1}$ is chosen such that $|\rho_{1,j}| \geq \rho$ for all $j=1, K_{t,1}$ and $|\rho_{1,1+k t,1}|<\rho$. The number of tones in the second bin $K_{t,2}$ is chosen such that $|\rho_{1+Kt,1,j}| \geq \rho$ for all $j=1+K_{t,1}, \ldots, K_{t,2}$ and $|\rho_{1,1+kt,2}|<\rho$, and so on. These cross-correlation coefficients may be estimated beforehand in case of a static binning algorithm. Or they may be periodically estimated (using sliding window moving average techniques) in case of a dynamic binning algorithm.

Figure 6A:
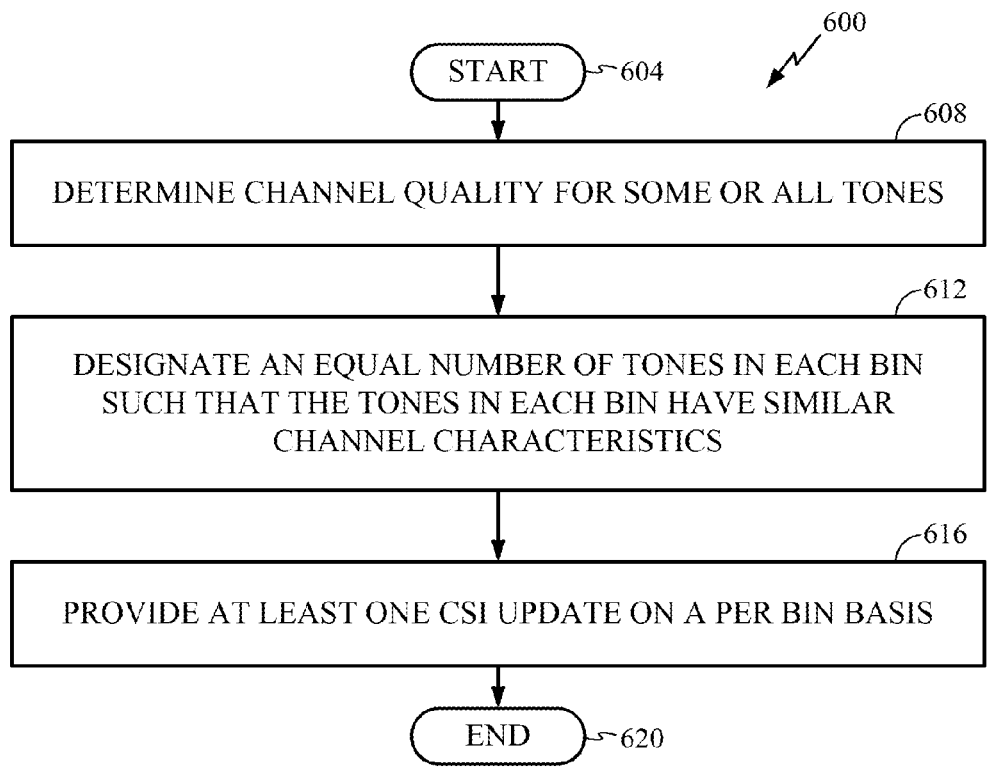
FIG. 6A is a flow chart illustrating a first binning process.

FIG. 6A is a flow chart illustrating a first binning process 600. Process 600 illustrates how the receiver 114 may communicate CSI to the transmitter 110 via the feedback channel 122 as shown in the communication system 100 of FIGS. 1 and 3. Process 600 may be performed by the receiver 114 as shown in FIGS. 1 and 3. Reference will be made to elements in FIGS. 3 and 5A when describing process 600.

The process 600 begins at start block 604. The process 600 then moves to block 608 where the receiver 114 determines channel conditions for some or all of Tones 1 through 16 in the channel 118, using channel estimator 338. After determining the channel conditions for some or all of the tones, the process moves to block 612. At block 612, the receiver 114 designates an equal number of tones in each bin such that the tones in each bin have similar channel characteristics. Process 600 may designate the tones to different bins in the same manner shown in FIG. 5A. The CSI module 342 of the receiver 114 may be used to designate Tones 1 through 16 to Bins 1 through 4 as shown in FIG. 5A. Alternatively, the processor 326 of the receiver 114 may be used to designate Tones 1 through 16 to Bins 1 through 4. After designating the tones to the appropriate bin, the process 600 then moves to block 616 where the receiver 114 provides at least one CSI update on a per bin basis. For example, the receiver 114 may send a CSI update for each of Bins 1 through 4 (as shown in FIG. 5A), via the feedback channel 122. The CSI module 342 may be used to provide the at least one CSI update. The process 600 finally moves to end block 620, where the process 600 ends.

In one embodiment, process 600 may loop between blocks 608 to 616 any number of times. For example, in a first iteration, the receiver 114 may determine the channel conditions of Tones 1 through 16 and designate Tones 1 through 16 into Bins 1 through 4 and provide first a CSI update for each of Bins 1 through 4. A period of time later, in a second iteration, the receiver 114 may re-determine the channel conditions of Tones 1 through 16 and designate Tones 1 through 16 into Bins 1 through 4 and provide a second CSI update for each of Bins 1 through 4.

Figure 6B:
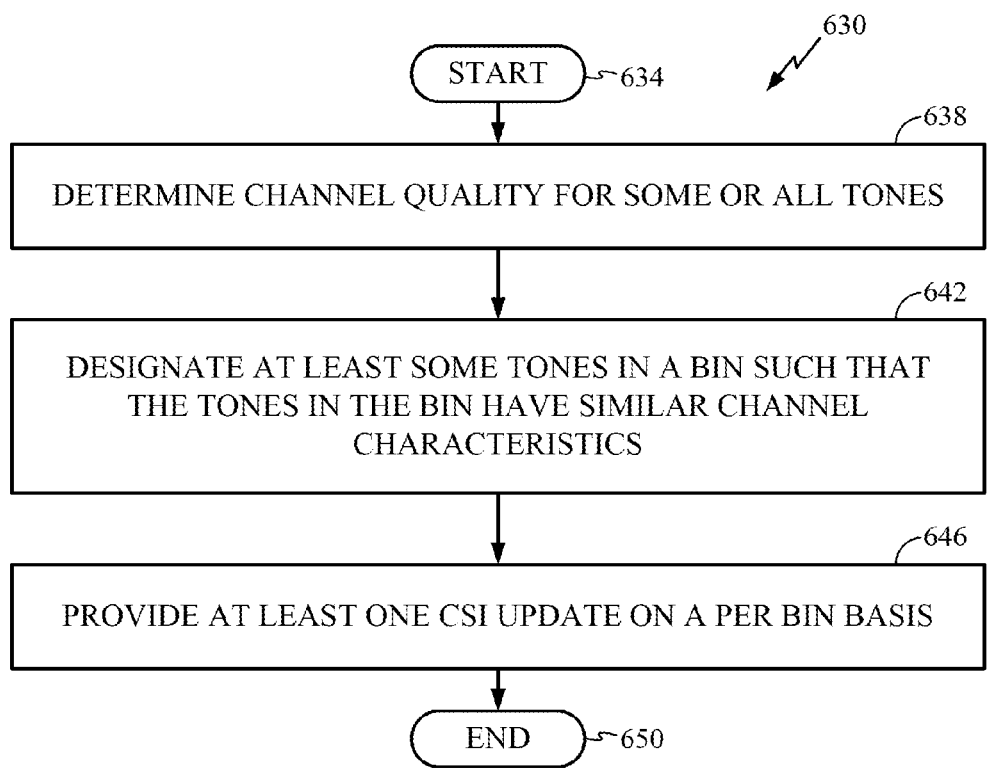
FIG. 6B is a flow chart illustrating a second binning process.

FIG. 6B is a flow chart illustrating a second binning process. Process 630 illustrates how the receiver 114 may communicate CSI to the transmitter 110 via the feedback channel 122 as shown in the communication system 100 of FIGS. 1 and 3. Process 630 may performed by the receiver 114 as shown in FIGS. 1 and 3. Reference will be made to elements in FIGS. 3 and 5B when describing process 630.

The process 630 begins at start block 634. The process 630 then moves to block 638 where the receiver 114 determines channel conditions for some or all of Tones 1 through 16 in the channel 118, using channel estimator 338. After determining the channel conditions for some or all of the tones, the process moves to block 642. At block 642, the receiver 114 designates at least some of Tones 1 through 16 in a bin such that the tones in the bin have similar channel characteristics. Process 630 may designate the tones to different bins in the same manner shown in FIG. 5B. The CSI module 342 of the receiver 114 may be used to designate Tones 1 through 16 to Bins 1 through 5 as shown in FIG. 5B. Alternatively, the processor 326 of the receiver 114 may be used to designate Tones 1 through 16 to Bins 1 through 5. After designating the tones to the appropriate bin, the process 630 then moves to block 646, where the receiver 114 provides at least one CSI update on a per bin basis. For example, the receiver 114 may send a CSI update for each of Bins 1 through 5 (as shown in FIG. 5B), via the feedback channel 122. The CSI module 342 may be used to provide the at least one CSI update. The process 630 finally moves to end block 650, where the process 630 ends.

In one embodiment, process 630 may loop between blocks 638 to 646 any number of times. For example, in a first iteration, the receiver 114 may determine the channel conditions of Tones 1 through 16 and designate Tones 1 through 16 into Bins 1 through 5 and provide first a CSI update for each of Bins 1 through 5. A period of time later, in a second iteration, the receiver 114 may re-determine the channel conditions of Tones 1 through 16 and designate Tones 1 through 16 into Bins 1 through 5 and provide a second CSI update for each of Bins 1 through 5.

Figure 6C:
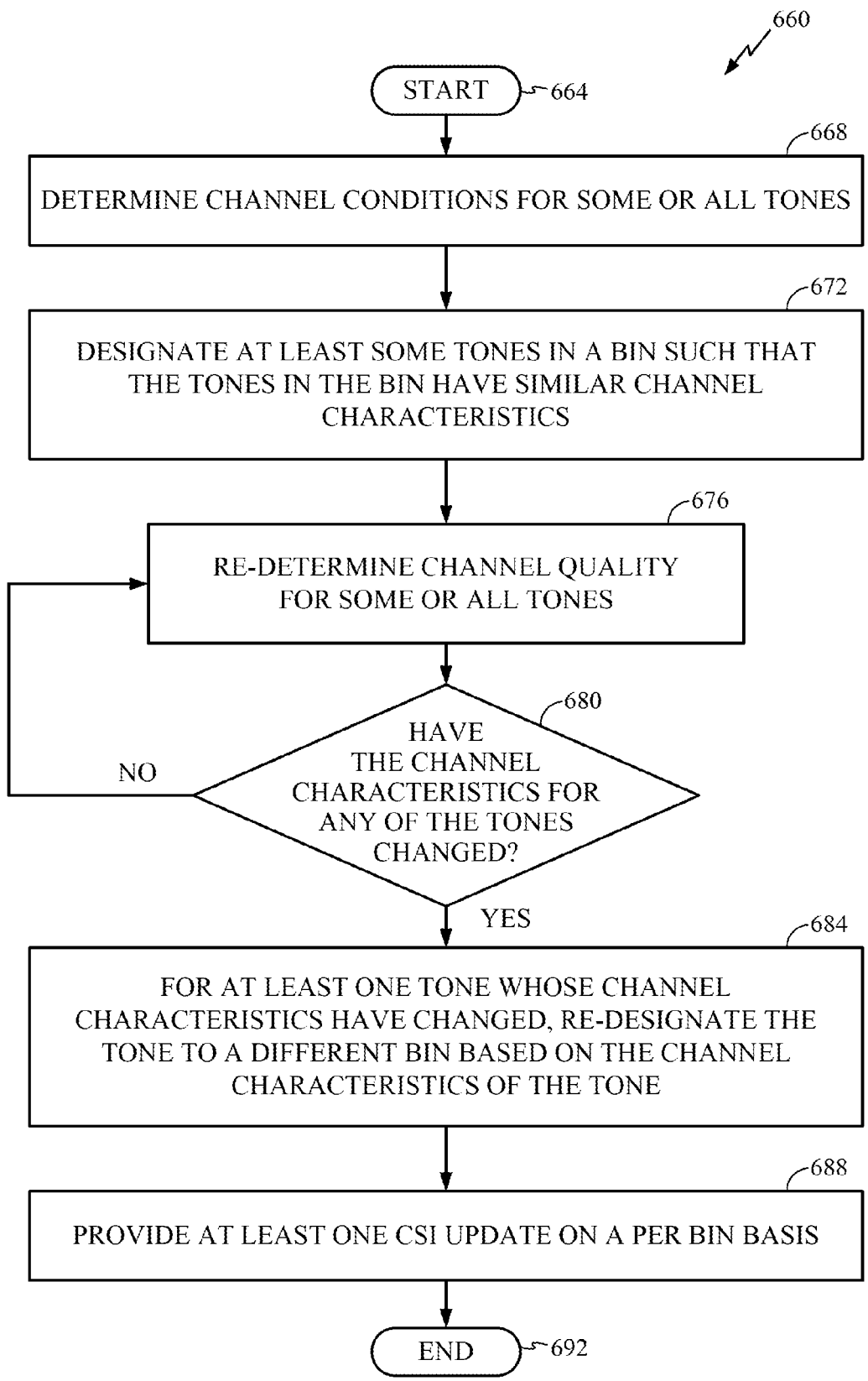
FIG. 6C is a flow chart illustrating a third binning process.

FIG. 6C is a flow chart illustrating a third binning process 660. Process 660 illustrates how the receiver 114 may communicate CSI to the transmitter 110 via the feedback channel 122 as shown in the communication system 100 of FIGS. 1 and 3. Process 660 may be performed by the receiver 114 as shown in FIGS. 1 and 3. Reference will be made to elements in FIGS. 3, 5C and 5D when describing process 660.

The process 660 begins at start block 664. The process 660 then moves to block 668 where the receiver 114 determines channel conditions for some or all of Tones 1 through 16 in the channel 118, using channel estimator 338. After determining the channel conditions for some or all of the tones, the process moves to block 672. At block 672, the receiver 114 designates at least some of Tones 1 through 16 in a bin such that the tones in the bin have similar channel characteristics. Process 660 may initially designate the tones to different bins in the same manner shown in FIG. 5C. The CSI module 342 of the receiver 114 may be used to designate Tones 1 through 16 to Bins 1 through 5 as shown in FIG. 5C. Alternatively, the processor 326 of the receiver 114 may be used to designate Tones 1 through 16 to Bins 1 through 5. After designating the tones to the appropriate bin, the process 660 then moves to block 676, where the receiver 114 re-determines channel conditions for some or all of Tones 1 through 16 using channel estimator 338.

After re-determining the channel conditions for some or all of Tones 1 through 16, the process 660 moves to block 680. At block 680, the receiver 114 will determine if the channel characteristics for any of Tones 1 through 16 have changed. If there is no change in the channel characteristics for any of Tones 1 through 16, then the process loops back to block 676, where the receiver 114 re-determines channel conditions for some or all of Tones 1 through 16 using channel estimator 338. If there is a change in channel characteristics for any of Tones 1 through 16, the process moves to block 684, where at least one of the Tones 1 through 16, which experienced changing channel conditions, is re-designated into a different bin based on its channel conditions. Referring to FIG. 5D, Tone 4 is re-designated to Bin 1 based on, at least in part, the change in Tone 4's channel conditions. After re-designating at least one tone, the process moves to block 688, where the receiver 114 provides at least one CSI update on a per bin basis. For example, the receiver 114 may send a CSI update for each of Bins 1 through 5 (as shown in FIG. 5D), via the feedback channel 122. The CSI module 342 may be used to provide the at least one CSI update. The process 660 finally moves to end block 692, where the process 660 ends. In another embodiment, process 660 may loop between blocks 676 to 688 any number of times.

The following embodiments are generally directed to systems and methods for conveying CSI from the receiver 114 to the transmitter 110 over the feedback channel 122 in the communication system 100 shown in FIG. 3. The following embodiments may also reference elements shown in FIG. 3.

As discussed above, one of the many objectives of the CSI may be to enable adaptive resource allocation of the channel 118 at the transmitter 110. Even if the communication system 100 uses the binning processes described above, the size of each CSI packet may be larger than the available fields in existing packet header (e.g., supplemental information such as addresses, type of date etc.) formats. Depending on the communication standard (e.g., the MAC and/or PHY protocols) used by the communication system 100, there may be different restrictions on the size of the CSI packet. For example, in one embodiment, the communication system 100 may use the ECMA-386 communication standard which may not allow more than a few bits of additional information in the header fields. In the communication system 100, it may be difficult to update the hardware and/or software of the transmitter 110 and the receiver 114. New types of CSI such as binning CSI (e.g., CSI provided on a per bin basis) may be used by the receiver 114 and the transmitter 110. Thus, it is desirable to convey new types and/or more CSI without substantially changing the transmitter 110, the receiver 114 of the communication system 100, and/or the communication protocol used by the transmitter 110 and the receiver 114.

In one embodiment the CSI may comprise a new Application Specific Information Element (ASIE). The ASIE may allow new types of information to be sent in communication system 100, without substantially modifying the existing hardware/software of communication system 100. The ASIE may comprise a Specifier ID 16-bit field which identifies a company or organization who defines the format and use of the ASIE. The ASIE may be sent in beacon and/or control frames (e.g., frames which may be used to coordinate the receiver 114 and transmitter 110 and may be used to provide timing, scheduling, capability, and other information). This embodiment may not require changes in the communication system 100. If a new ASIE is transmitted from the receiver 114 to the transmitter 110, and the transmitter 110 does not support the new ASIE, the transmitter 110 may simply ignore the ASIE. This embodiment may be used when CSI is sent on a best effort basis, e.g., the feedback is sent only when the beacon slot can accommodate the CSI. In another embodiment, the CSI may comprise at least one of an Application-Specific Control Frame and an Application Specific Command Frame. The Application-Specific Control and Command Frame may also comprise Specifier ID field. The company or organization associated with the Specifier ID may define the format and use of the Data field in the Application-Specific Control or Command frames.

Another embodiment may use a block-acknowledgement (B-ACK) to send CSI. The communication system 100 (e.g., such as an OFDM system) may enable the receiver 114 to acknowledge the receipt of a sequence of MAC service data units (MSDUs) using a B-ACK packet. The B-ACKs may be sent by the receiver 114 when there is a B-ACK request from the transmitter 110 for the MSDUs sent from the transmitter 110 to the receiver 114 over the channel 118. The CSI may be sent along with the B-ACK information in an "enhanced" B-ACK packet. In this embodiment, the periodicity of CSI feedback may depend on the periodicity of the B-ACK packets. In another embodiment, the CSI packets may need to be fragmented. Certain embodiments may require changes the communication system 100 as a new type of "enhanced" B-ACK may need to be defined.

In another embodiment the ASIE containing CSI may also be sent from the receiver 114 to the transmitter 110 using MAC command frames during reserved medium access slots (MASs). The reserved MASs are used by the receiver 114 to transmit the CSI to the transmitter 110 over the feedback channel 122. This embodiment may allow CSI to be sent to the transmitter 114 at consistent time intervals. The timing and frequency of CSI may be set up during the MAS reservation negotiations between the transmitter 110 and the receiver 114. In another embodiment, prioritized contention access (PCA) may be may be used to transmit CSI over the feedback channel 122 when both transmitter 110 and receiver 114 support PCA.

As shown in FIG. 3, the channel 118 may be used to transmit data between transmitter 110 and receiver 114. Data may be transmitted bi-directionally, meaning that data may be transmitted from the transmitter 110 to the receiver 114, and it may be transmitted from the receiver 114 to the transmitter 110. In one embodiment, CSI may be "piggybacked" e.g., sent along with, the data traffic sent from the receiver 114 to the transmitter 110. In this embodiment, the CSI packets may be fragmented. This embodiment may be suitable if there is steady data traffic sent from the receiver 114 to the transmitter 110.

The above-embodiments may be combined to and/or used in conjunction with each other. For example, at least one of enhanced B-ACK or piggybacking may be used for binning CSI on a best effort basis.

Figures 7, 8:
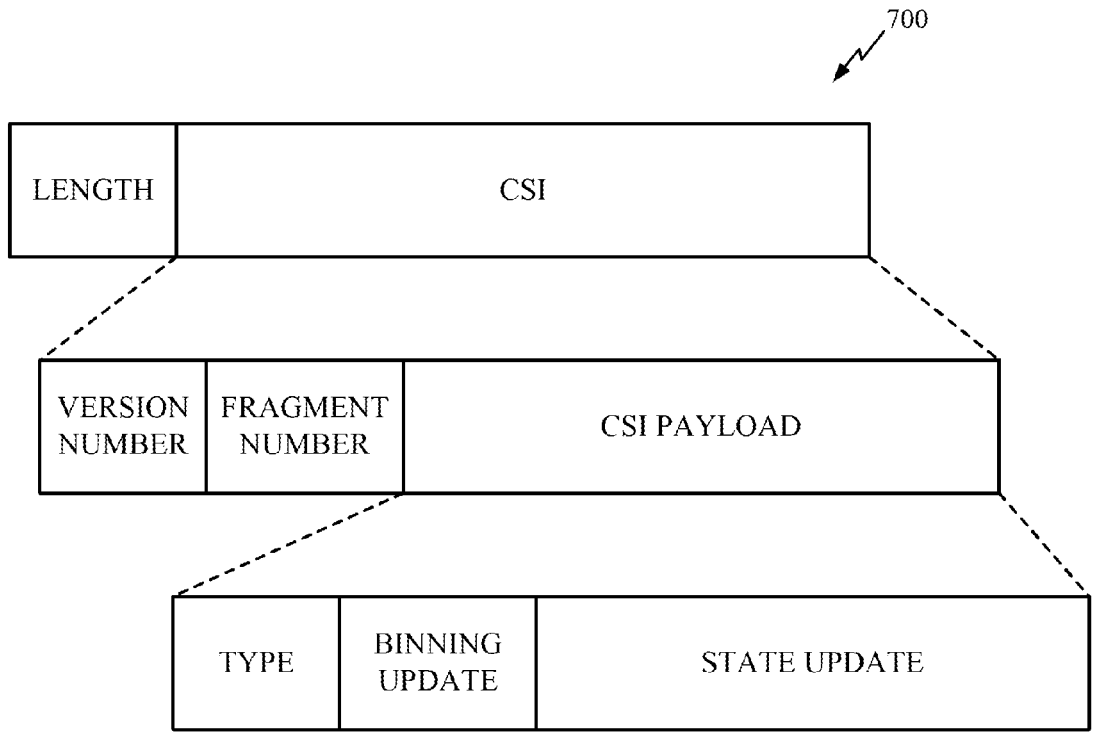
FIG. 7 shows an exemplary format of a CSI packet, according to one embodiment.
FIG. 8 is a table which illustrates exemplary feedback loads and average data rates for various compression schemes.

FIG. 7 shows an exemplary format of a CSI packet 700, according to one embodiment. The CSI packet 700 may comprise a LENGTH field and a CSI field. The LENGTH field may comprise the total length of CSI packet 700. The CSI field may comprise a VERSION NUMBER, a FRAGMENT NUMBER and a CSI PAYLOAD. The VERSION NUMBER may be used by the transmitter 110 and the receiver 114 to synchronize the CSI. For example, a first CSI packet may not be received by the transmitter 110. The receiver 114 may continue transmitting subsequent packets even though the first CSI packet was not received by the transmitter 110. The VERSION NUMBER may be used to help ensure the CSI packets are received in the corrected order and/or may be used to re-transmit CSI packets which were not received by the transmitter 110. In the embodiment where the CSI is split over multiple MAC packets, the FRAGMENT NUMBER may used to identify which fragment is in the CSI PAYLOAD. The CSI PAYLOAD may comprise a TYPE field, BINNING UPDATE field and STATE UPDATE field. The BINNING UPDATE field may be used to provide information related to the re-designation of Tones 1 through 16 into Bins 1 through 5, as shown in FIGS. 5C and 5D. The STATE UPDATE field may specify the current channel state. This embodiment may be combined with the above-described embodiments for sending CSI. For example CSI packet 700 may be sent in an ASIE or piggybacked with B-ACK or other data over the channel 118 or the feedback channel 122 of the communication system 100.

As shown in FIG. 7, the feedback packet may comprise a variety of information as needed by the communication system 100 to dynamically allocate resources to channel 118. FIG. 7 merely describes one exemplary implementation. Embodiments of the invention are applicable to other implementations of feedback packets. In one embodiment the transmitter 110 and the receiver 114 may be synchronized with respect to the CSI version (e.g., the VERSION NUMBER) as the transmitter 110 may indicate the CSI version used by using some reserved bits (e.g., bits that may be reserved for future use) in the header. In one embodiment, this CSI version may or may not be the latest CSI version the receiver sent to the transmitter. For example, the transmitter 110 may not have a current version of CSI if a previous CSI feedback packet was not received (e.g., lost in transit). Then the transmitter's last received CSI feedback packet will have an older version number. Thus, the transmitter 110 will know that it did not receive the previous CSI feedback packet by looking at the CSI version of the new CSI feedback packet.

CSI packet 700 may be classified into at least four different types. In one embodiment, the two different types, which are indicated by the TYPE field as shown in FIG. 7, are:

TYPE "10": Fixed size binning update.
TYPE "11": Variable size binning update.

The first type is a fixed size binning update and the second type is a variable size binning update. If a static binning process is used, it may be necessary to provide updates of new bin designations for the Tones 1 though 16. For example, as discussed above, initially, there may be 4 bins with 4 tones in each bin. That fixed binning scheme may be changed to 8 bins with two tones in each bin. A fixed-size binning update may be used to convey this information to the transmitter 110. If a dynamic binning process is used, it may be necessary to provide updates of the new bin designations for the Tones 1 through 16, as shown in FIGS. 5C and 5D. A variable size binning update may be used to convey this information to the transmitter 110. In one embodiment whenever binning CSI is generated by the receiver 114, it may be desirable to provide full CSI as well. In the embodiment where a static binning process is used by the receiver 114, binning CSI is not used. Thus, only the first two types of feedback packets will be used.

STATE UPDATE: This field contains updated CSI for all the spectral bins. The updates may be fixed-size binning updates or variable size binning updates, depending on the TYPE field.

As shown in FIG. 7, the CSI packet 700 also comprises a BINNING UPDATE field. In one embodiment, if a static binning process is used, this field is not required. In another embodiment, if a dynamic binning process is used, the BINNING UPDATE field may contain information about the changes in the bin designations. In yet another embodiment, if a fixed size binning process is used, the BINNING UPDATE field may comprise single bin size. In one embodiment, if a variable size binning process is used, this field may contain information about the total number of bins and/or the sequence of bin sizes.

FIG. 8 is a table 800 which illustrates exemplary feedback loads and average data rates for various compression schemes. The table 800 has three columns labeled: Compression Scheme, Feedback load and Average rate. The Compression Scheme column identifies the type of compression which may be used by the communication system 100. The types of compression scheme shown in the Compression Scheme column are "No Compressed," "Fixed binning," and "Variable binning." Fixed binning is further divided into size 4 and size 6 (e.g., the bins have 4 or 6 tones respectively). Variable binning is divided into two categories: no limit in bin size or a bin size which is less than or equal to 16 but greater than or equal to 4. The Feedback load represents the number of bits that the communication system may use for CSI, using the corresponding compression scheme. For example, for a fix binning compression scheme with a bin size of 4, 100 bits may be used for CSI. In another example, in a variable binning scheme with no a bin size between 4 and 16, 173 bits may be used for CSI. The Average rate column indicates the average data rate achieved using the corresponding compression scheme. For example, the average data rate achieved using a fix binning scheme with a bin size of 16 is 265.43 Mbps.

In one embodiment, depending on the available padding area (e.g., extra bits used to "pad" a packet so that it is a certain length) in the current MAC packet, it may be desirable to divide the feedback payload into multiple fragments and send them in successive MAC packets. In one embodiment, it may be necessary to fragment the CSI payload and send the different fragments in successive MAC packet transmissions. This embodiment may use a fragmentation technique in which the CSI payload is split into two or more parts. The length of the first part is chosen such that the overall fragmented packet size equals the available MAC frame padding area. The FRAGMENT NUMBER field provides the index of the fragment, and is incremented in successive transmissions. In one embodiment, the FRAGMENT NUMBER may be resent when the CSI version changes. For example, when VERSION filed of CSI packets changes from 1 to 2, the FRAGMENT number may reset to 0. The second and other parts of the CSI payload may run through the same fragmentation procedure when the next MAC packet is constructed.

The CSI packet 700 may be highly time-sensitive. Thus, in one embodiment, these packets are not be fragmented many times as this may delay the transmission of the CSI packet 700 from the receiver 114 to the transmitter 110. New CSI packets, such as CSI packet 700, may be generated based on recent channel estimates. If the new CSI packets vary from the previous ones, then the transmission of the fragments of previous CSI packet may be stopped and the new CSI packets may be transmitted instead.

The above-described methods may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above. In addition, the steps described in the above-referenced figures may be performed in a different order, may be performed simultaneously and certain of the steps may be omitted.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of communication in a wireless communication system, the method comprising:
obtaining a first set of channel condition data representative of a collective channel condition of a first plurality of carrier frequencies, wherein at least one first carrier frequency is grouped in the first plurality of carrier frequencies based, at least in part, on at least one of a channel condition of the at least one first carrier frequency and the collective channel condition; and
communicating the first set of channel condition data from a receiver to a transmitter.

2. The method of claim 1, further comprising obtaining a second set of channel condition data representative of a collective channel condition of a second plurality of carrier frequencies, wherein at least one second carrier frequency is grouped in the second plurality of carrier frequencies based, at least in part, on a channel condition of the at least one second carrier frequency.

3. The method of claim 2, wherein a number of the first plurality of carrier frequencies is equal to a number of the second plurality of carrier frequencies.

4. The method of claim 3, wherein the first plurality of carrier frequencies and the second plurality of carrier frequencies remain unchanged, regardless of changes in the channel condition of any carrier frequency of the first and/or second plurality of carrier frequencies.

5. The method of claim 2, wherein a number of the first plurality of carrier frequencies is different from a number of the second plurality of carrier frequencies.

6. The method of claim 5, wherein the first plurality of carrier frequencies and the second plurality of carrier frequencies remain unchanged, regardless of changes in the channel condition of any carrier frequency of the first and/or second plurality of carrier frequencies.

7. The method of claim 2, further comprising determining that the channel condition of at least one first carrier frequency has varied.

8. The method of claim 7, further comprising re-assigning the at least one first carrier frequency from the first plurality of carrier frequencies to the second plurality of carrier frequencies in response to the varied channel condition.

9. The method of claim 8, further comprising obtaining a third set of channel condition data, wherein the third set of channel condition data comprises data representative of a collective channel condition of the second plurality of carrier frequencies comprising the at least one first carrier frequency.

10. The method of claim 8, further comprising providing information indicative of the reassignment of the first carrier frequency to the second plurality of carrier frequencies.

11. The method of claim 7, further comprising re-assigning the at least one second carrier frequency from the second plurality of carrier frequencies to another plurality of carrier frequencies.

12. The method of claim 7, further comprising re-assigning the first carrier frequency from the first plurality of carrier frequencies to a third plurality of carrier frequencies in response to the varied channel condition.

13. The method of claim 2, wherein at least one of the first set of channel condition data and the second set of channel condition data comprises at least one of a noise level and a data rate.

14. A device operable in a wireless communication system, the device comprising:
a first module configured to obtain a first set of channel condition data representative of a collective channel condition of a first plurality of carrier frequencies, wherein at least one first carrier frequency is grouped in the first plurality of carrier frequencies based, at least in part, on at least one of a channel condition of the first carrier frequency and the collective channel condition; and
a second module configured to communicate the first set of channel condition data from a receiver to a transmitter.

15. The device of claim 14, wherein the first module is further configured to obtain a second set of channel condition data representative of a collective channel condition of a second plurality of carrier frequencies, wherein at least one second carrier frequency is grouped in the second plurality of carrier frequencies based, at least in part, on a channel condition of the at least one second carrier frequency.

16. The device of claim 15, wherein a number of the first plurality of carrier frequencies is equal to a number of the second plurality of carrier frequencies.

17. The device of claim 16, wherein the first plurality of carrier frequencies and the second plurality of carrier frequencies remain unchanged, regardless of changes in the channel condition of any carrier frequency of the first and/or second plurality of carrier frequencies.

18. The device of claim 15, wherein a number of the first plurality of carrier frequencies is different from a number of the second plurality of carrier frequencies.

19. The device of claim 18, wherein the first plurality of carrier frequencies and the second plurality of carrier frequencies remain unchanged, regardless of changes in the channel condition of any carrier frequency of the first and/or second plurality of carrier frequencies.

20. The device of claim 15, wherein the first module is further configured to determine that the channel condition of at least one first carrier frequency has varied.

21. The device of claim 20, wherein the first module is further configured to re-assign the at least one first carrier frequency from the first plurality of carrier frequencies to the second plurality of carrier frequencies in response to the varied channel condition.

22. The device of claim 21, wherein the first module is further configured to obtain a third set of channel condition data, wherein the third set of channel condition data comprises data representative of a collective channel condition of the second plurality of carrier frequencies comprising the at least one first carrier frequency.

23. The device of claim 21, wherein the second module is further configured to provide information indicative of the reassignment of the first carrier frequency to the second plurality of carrier frequencies.

24. The device of claim 20, wherein the first module is further configured to re-assign at least one second carrier frequency from the second plurality of carrier frequencies to another plurality of carrier frequencies.

25. The device of claim 20, wherein the first module is further configured to re-assign the first carrier frequency from the first plurality of carrier frequencies to a third plurality of carrier frequencies in response to the varied channel condition.

26. The device of claim 15, wherein at least one of the first set of channel condition data and the second set of channel condition data comprises at least one of a noise level and a data rate.

27. The device of claim 14, wherein the first module comprises at least one of a channel estimator module, a channel state information module, a processor, and a memory.

28. The device of claim 14, wherein the second module comprises at least one of a transmitter, a transceiver, and an antenna.

29. A device operable in a wireless communication system, the device comprising:
means for obtaining a first set of channel condition data representative of a collective channel condition of a first plurality of carrier frequencies, wherein at least one first carrier frequency is grouped in the first plurality of carrier frequencies based, at least in part, on at least one of a channel condition of the first carrier frequency and the collective channel condition; and
means for communicating the first set of channel condition data from a receiver to a transmitter.

30. The device of claim 29, wherein the obtaining means is further configured to obtain a second set of channel condition data representative of a collective channel condition of a second plurality of carrier frequencies, wherein at least one second carrier frequency is grouped in the second plurality of carrier frequencies based, at least in part, on a channel condition of the at least one second carrier frequency.

31. The device of claim 30, wherein a number of the first plurality of carrier frequencies is equal to a number of the second plurality of carrier frequencies.

32. The device of claim 31, wherein the first plurality of carrier frequencies and the second plurality of carrier frequencies remain unchanged, regardless of changes in the channel condition of any carrier frequency of the first and/or second plurality of carrier frequencies.

33. The device of claim 30, wherein a number of the first plurality of carrier frequencies is different from a number of the second plurality of carrier frequencies.

34. The device of claim 33, wherein the first plurality of carrier frequencies and the second plurality of carrier frequencies remain unchanged, regardless of changes in the channel condition of any carrier frequency of the first and/or second plurality of carrier frequencies.

35. The device of claim 30, wherein the obtaining means is further configured to determine that the channel condition of at least one first carrier frequency has varied.

36. The device of claim 35, wherein the obtaining means is further configured to re-assign the at least one first carrier frequency from the first plurality of carrier frequencies to the second plurality of carrier frequencies in response to the varied channel condition.

37. The device of claim 36, wherein the obtaining means is further configured to obtain a third set of channel condition data, wherein the third set of channel condition data comprises data representative of a collective channel condition of the second plurality of carrier frequencies comprising the at least one first carrier frequency.

38. The device of claim 36, wherein the communication means is further configured to provide information indicative of the reassignment of the first carrier frequency to the second plurality of carrier frequencies.

39. The device of claim 35, wherein the obtaining means is further configured to re-assign the at least one second carrier frequency from the second plurality of carrier frequencies to another plurality of carrier frequencies.

40. The device of claim 35, wherein the obtaining means is further configured to re-assign the first carrier frequency from the first plurality of carrier frequencies to a third plurality of carrier frequencies in response to the varied channel condition.

41. The device of claim 30, wherein at least one of the first set of channel condition data and the second set of channel condition data comprises at least one of a noise level and a data rate.

42. A computer program product, comprising: a computer-readable storage device comprising:
code for causing a computer to obtain a first set of channel condition data representative of a collective channel condition of a first plurality of carrier frequencies, wherein at least one first carrier frequency is grouped in the first plurality of carrier frequencies based, at least in part, on at least one of a channel condition of the first carrier frequency and the collective channel condition; and
code for causing the computer to communicate the first set of channel condition data from a receiver to a transmitter.

43. The computer program product of claim 42, further comprising code for causing a computer to obtain a second set of channel condition data representative of a collective channel condition of a second plurality of carrier frequencies, wherein at least one second carrier frequency is grouped in the second plurality of carrier frequencies based, at least in part, on a channel condition of the at least one second carrier frequency.

44. The computer program product of claim 43, wherein a number of the first plurality of carrier frequencies is equal to a number of the second plurality of carrier frequencies.

45. The computer program product of claim 44, wherein the first plurality of carrier frequencies and the second plurality of carrier frequencies remain unchanged, regardless of changes in the channel condition of any carrier frequency of the first and/or second plurality of carrier frequencies.

46. The computer program product of claim 43, wherein a number of the first plurality of carrier frequencies is different from a number of the second plurality of carrier frequencies.

47. The computer program product of claim 46, wherein the first plurality of carrier frequencies and the second plurality of carrier frequencies remain unchanged, regardless of changes in the channel condition of any carrier frequency of the first and/or second plurality of carrier frequencies.

48. The computer program product of claim 43, further comprising code for causing a computer to determine that the channel condition of a at least one first carrier frequency has varied.

49. The computer program product of claim 48, further comprising code for causing a computer to re-assign the at least one first carrier frequency from the first plurality of carrier frequencies to the second plurality of carrier frequencies in response to the varied channel condition.

50. The computer program product of claim 49, further comprising code for causing a computer to obtain a third set of channel condition data, wherein the third set of channel condition data comprises data representative of a collective channel condition of the second plurality of carrier frequencies comprising the at least one first carrier frequency.

51. The computer program product of claim 49, further comprising code for causing a computer to provide information indicative of the reassignment of the first carrier frequency to the second plurality of carrier frequencies.

52. The computer program product of claim 48, further comprising code for causing a computer to re-assign the at least one second carrier frequency from the second plurality of carrier frequencies to another plurality of carrier frequencies.

53. The computer program product of claim 48, further comprising code for causing a computer to re-assign the first carrier frequency from the first plurality of carrier frequencies to a third plurality of carrier frequencies in response to the varied channel condition.

54. The computer program product of claim 43, wherein at least one of the first set of channel condition data and the second set of channel condition data comprises at least one of a noise level and a data rate.

* * * * *